United States Patent [19]

Nishi et al.

[11] Patent Number: 4,977,790
[45] Date of Patent: Dec. 18, 1990

[54] FLEXIBLE ARM

[75] Inventors: Yozo Nishi; Hiroaki Takagi, both of Hiratsuka, Japan

[73] Assignee: Kabushiki Kaisha Komatsu Seisakusho, Tokyo, Japan

[21] Appl. No.: 415,279
[22] PCT Filed: Mar. 23, 1988
[86] PCT No.: PCT/JP88/00302
§ 371 Date: Oct. 24, 1989
§ 102(e) Date: Oct. 24, 1989
[87] PCT Pub. No.: WO88/07441
PCT Pub. Date: Oct. 6, 1988

[30] Foreign Application Priority Data

Mar. 23, 1987 [JP] Japan ............................. 62-068652

[51] Int. Cl.$^5$ .............................................. B25J 18/06
[52] U.S. Cl. .......................................... 74/479; 901/21
[58] Field of Search .................... 74/479; 901/15, 21, 901/28, 14

[56] References Cited

U.S. PATENT DOCUMENTS

| | | | |
|---|---|---|---|
| 3,712,481 | 1/1973 | Harwood | 74/469 X |
| 4,393,728 | 7/1983 | Larson et al. | 74/469 |
| 4,494,417 | 1/1985 | Larson et al. | 74/479 X |
| 4,724,716 | 2/1988 | Kawai | 74/479 |
| 4,815,911 | 3/1989 | Bengtsson et al. | 901/21 X |
| 4,848,179 | 7/1989 | Ubhayakar | 74/479 |

FOREIGN PATENT DOCUMENTS 59-3834   2/1984  Japan .
60-18312  6/1985  Japan .
61-290212 12/1986 Japan .

Primary Examiner—Richard E. Moore
Attorney, Agent, or Firm—Ronald P. Kananen

[57] ABSTRACT

A flexible arm capable of smoothly effecting bending for an extended period and improving positioning accuracy comprises a plurality of vertically stacked units (1) consisting of one disc (5) which has projectingly curved contact surfaces on both sides in an axial direction, one support plate (4) which is fixed to a coaxial center hole of the disc and has a plurality of plate fitting surfaces (4a) disposed on both sides of the peripheral portion in the axial direction with their phases shifted from one another, two torsion plates which have a center hole for loosely accommodating the disc and fitting surfaces (19) around their peripheral portions fixed to the plate fitting surfaces of the support plate, and one intermediate plate (6) which has a center hole for loosely accommodating the disc which are and whose fitting surfaces (15) around its pheripheral portion on both sides in the axial direction are fixed to the fitting surfaces of the torsion plates on the opposite side to the support plate.

2 Claims, 3 Drawing Sheets

FLEXIBLE ARM

TECHNICAL FIELD OF THE INVENTION

The present invention relates to a flexible arm including a plurality of discs being arranged in series in contact with each other and an actuating device arranged to operate in the discs or to actuate these discs for generating and/or transmitting power thereby to support and/or manipulate a tool or the like.

BACKGROUND ART OF THE INVENTION

Conventionally, this kind of a flexible arm is known as an arrangement provided with discs with curved surfaces arranged in series and wires, cables or the like attached to the discs to transmit power to the respective discs (e.g., Japanese Patent Publication No. 59-21756) or an arrangement provided with torsion plates for holding discs and transmitting power thereto (e.g., specifications of Sweden Patents No. 7902366-9 and No. 8001998-7).

Although the arm of a conventional robot generally moves vertically and horizontally and rotates, the above conventional flexible arm has a feature in that it can be curved and bent or moved in a direction opposite to a robot standing direction since the respective discs have curved surfaces.

As shown in FIGS. 1 and 2, in the above conventional flexible arm, a means for holding the respective discs comprises a minimum unit composed of four discs a, one support plate b, four torsion plates c and bushes e through which wires d pass. This minimum unit is such that the bushes e are fixed to the support plate b by spot welding or rivets, the torsion plate c and the disc a are integrally overlapped on each side of the support plate b and fixed thereto by spot welding or rivets, and each of the remaining two discs a is integrally fixed to each side of the two overlapped torsion plates c by spot welding or rivets. Thus, an element fixed to the support plate b side and an element fixed to the two torsion plate sides are arranged in such a manner that they are brought into contact with each other and the adjacent torsion plates are joined to each other at the outer peripheral portions thereof by spot welding or rivets.

With the above conventional arrangement, there is a problem in that the torsion plates are damaged or the surfaces where the discs are in contact are worn and made in a shape which does not have a prescribed curvature since a strong tensile strength or a compressing force is applied to an actuating device for transmitting force such as wires, cables or the like as well as to the above respective discs and the plates for supporting the discs, and thus the flexible arm cannot effect a smooth curving action.

In addition, there is also a problem in that when the tensile strength or the compression force is transmitted through the actuating device, the extreme end of the flexible arm is difficult to locate at a target position due to reactions from the respective discs and the support plates of the discs, and thus positioning accuracy is decreased.

BRIEF DESCRIPTION OF THE INVENTION

Taking the above into consideration, an object of the present invention is to provide a flexible arm capable of effecting a curving action for an extended period with improved positioning accuracy.

Another object of the present invention is to provide a flexible arm wherein only the force relating to jobs where is applied to respective units and reactions caused by friction and rigidity are absorbed by intermediate plates and torsion plates to prevent the torsion plates from being damaged and the surfaces where the discs are in contact from being partially worn, the stress being produced when rolling displacement is caused at surfaces where discs are in contact each other to curve and deform the units by the operation of an actuating device such as wires or the like and applied to the contact surfaces of the respective discs and the support plates.

To achieve the above objects, according to a first embodiment of the present invention, there is provided a flexible arm composed of a plurality of units disposed by being stacked in series and an actuating device connected thereto for curving the respective units, each of the units comprising:

(a) one disc having projectingly-curved contact surfaces defined on both sides thereof;

(b) one support plate provided with a central hole defined coaxially with the axial center thereof to which the disc is fixed and a plurality of plate fitting surfaces alternately defined on both sides at the peripheral portion thereof with their phases shifted 90° about the axial center, each pair of the fitting surfaces being composed of those symmetrical with respect to the axial center;

(c) two torsion plates each provided with a hole defined at the center thereof for loosely accommodating the disc and a plurality of plate fitting surfaces alternately defined on both sides at the peripheral portion thereof with their phases shifted 90° about the axial center thereof, the fitting surfaces defined on the same surface of the torsion plate in an axial direction being fixed to each pair of the plate fitting surfaces on both sides of the support plate; and (d) one intermediate plate provided with a central hole defined coaxially with the axial center thereof with which the disc is loosely engaged and the plate fitting surfaces which are defined on both sides in an axial direction at the peripheral portion thereof and have their phases shifted 180° from one another so that they are symmetrical with respect to the axial center, the plate fitting surfaces being fixed to a pair of the fitting surfaces on a side, which is not fixed to the plate fitting surfaces of the support plate, of one of the two torsion plates, whereby the respective discs of the respective units are brought into contact each other and the torsion plate and the intermediate plate of each unit are connected by the respective fitting surfaces.

According to a second embodiment of the present invention, there is provided a flexible arm wherein the respective plate fitting surfaces of the support plate and the intermediate plate in the flexible arm of the above first embodiment are inclined with respect to a surface perpendicular to the axis thereof so that they are made thinner toward the outside of the peripheral portions and the respective fitting surfaces of the torsion plates are fixed along this inclination.

Other objects, advantages and embodiments of the present invention will be clearly understood by the persons skilled in the art from the following description made with reference to the attached drawings.

DETAILED DESCRIPTION OF PREFERRED EMBODIMENT

Figure 1:
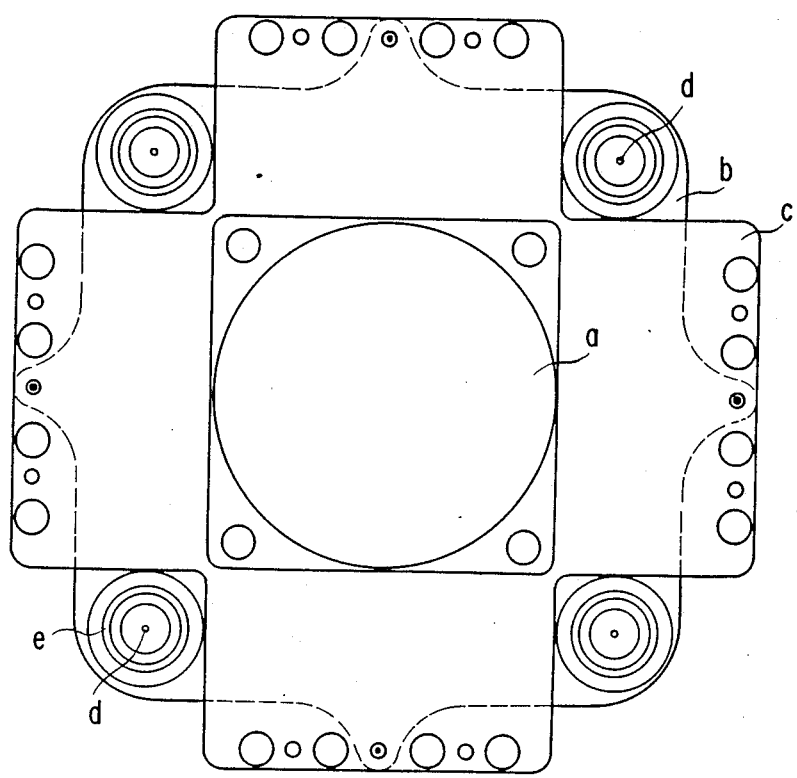
FIG. 1 and 2 are a schematic plan view and partial cross sectional view of a main part of a conventional embodiment.
Figure 2:
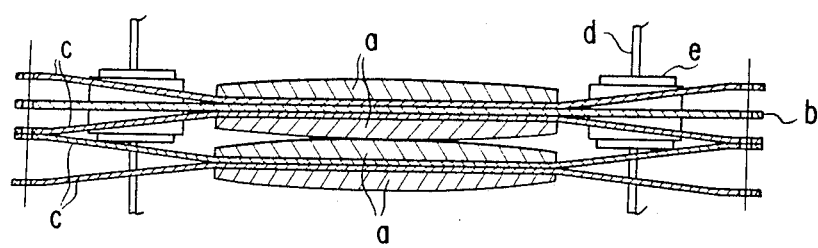
Figure 3:
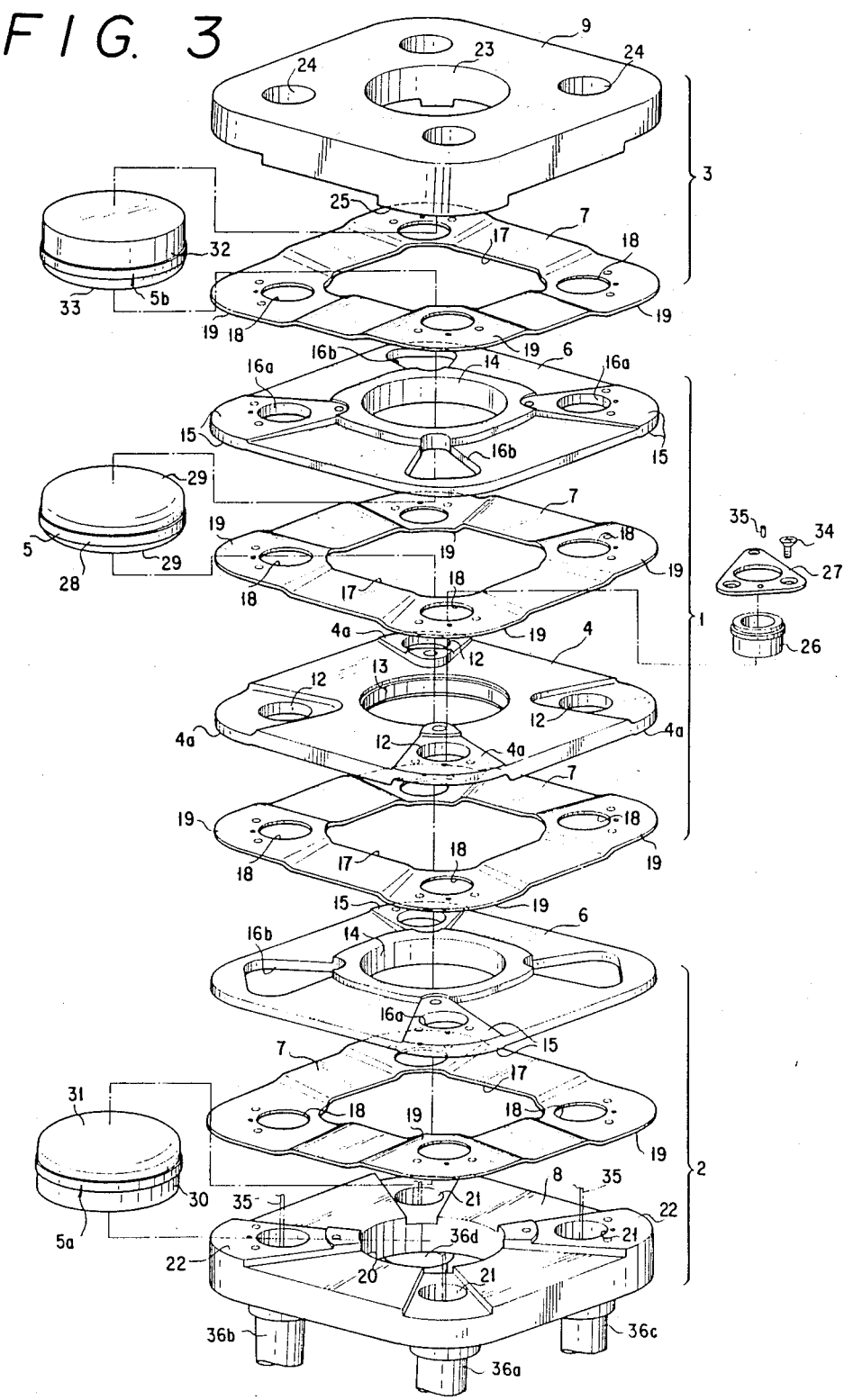
FIG. 3 is an exploded perspective view of an embodiment according to the present invention.
Figure 4:
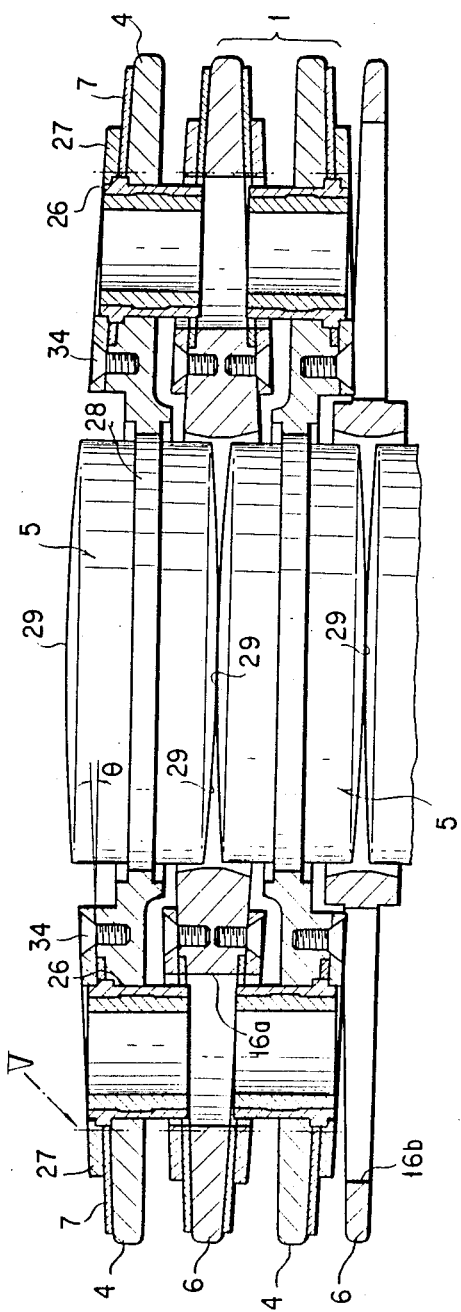
FIG. 4 is a vertical cross sectional view of a main part of the embodiment shown in FIG. 3 when it is assembled.
Figure 5:
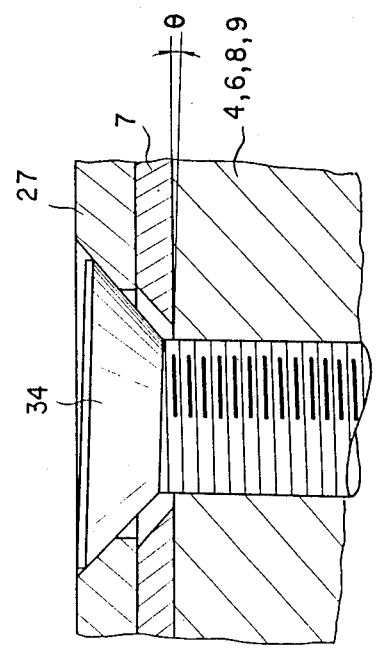
FIG. 5 is an enlarged cross sectional view taken along the line V of FIG. 4.

The present invention will be described below in detail with reference to an embodiment as shown in FIG. 3 to FIG. 5 of the accompanying drawings.

In the figures, reference numeral 1 designates a unit of a flexible arm and a plurality of these units 1, 1, . . . are disposed by being stacked in series.

The unit 1 comprises one support plate 4, one disc 5, one intermediate plate 6, and two torsion plates 7, 7.

In the above unit 1, the support plate has a substantially square surface shape with its four corners provided with bush engaging holes 12 defined therethrough. Further, the support plate 4 has a disc support hole 13 defined at the center thereof in which the disc 5 is fixed by force-fitting or the like. Furthermore, the four corners of the support plate 4 are provided with plate fitting surfaces 4a defined on the front and back surfaces of the support plate 4, the plate fitting surfaces 4a on the front surface having the phases thereof shifted 90° from those of the plate fitting surfaces 4a on the back surface and each pair of the plate fitting surfaces 4a being composed of those disposed in each direction of a diagonal line with respect to an axial center.

The intermediate plates 6 each having a substantially square surface shape identical to that of the above support plate 4 are positioned on both sides of the above support plate 4 in the axial direction thereof through the torsion plate 7 and provided with an extracting hole 14 defined at the center thereof with which the above disc 5 is engaged with a space. Further, the intermediate plate 6 is provided with plate fitting surfaces 15, 15 defined at the two portions of the four corners which are on a diagonal line with respect to the axial center thereof, the two portions being on the side of the plate fitting surface 4a of the above support plate 4 and having their phases shifted 90° therefrom and disposed on front and back surfaces, respectively. Furthermore, these four corners are defined with extracting holes 16a and 16b having different shapes, respectively.

The torsion plate 7 has a substantially square surface shape identical to that of the above support plate 4 and is provided with an extracting hole 17 defined at the center thereof for loosely accommodating the above disc 5 and extracting holes 18 of small diameter defined at the four corners thereof. The torsion plate 7 is warped with respect to its front and back surface direction and provided with two pairs of fitting surfaces 19 defined on the front and back surfaces thereof, each pair being composed of the fitting surfaces 19 symmetrical with respect to the axial center of the torsion plate 7 and the pair on the front surface having the phase thereof shifted 90° from that of the pair on the back surface in a front and back direction.

With the above units, 1, 1, . . . , a lower end unit 2 as a base end unit and an upper end unit 3 have their respective support plates 8 and 9, each having one flat outside surface to enable each support plate to be easily fixed. The surfaces of both support plates 8 and 9 are formed to shapes according to the surface configurations of the mating members. Both support plates 8 and 9 on the lower end side and the upper end side are provided with disc support holes 20 and 23, respectively, with which discs 5a and 5b are engaged. Further, plate fitting surfaces 22, 22, and 25, 25 are defined, respectively, at the two locations of both support plates 8 and 9 which are symmetrical with respect to the axial center thereof and confront against the fitting surfaces 19, 19 of the above torsion plates 7, 7. Furthermore, the support plates 8 and 9 have extracting holes 21 and 24 defined at the four corners thereof, respectively.

Each support plate 4 of the above respective units 1, 1, . . . has buses 26 engaged with the bush engaging holes 12 thereof. Designated at reference numeral 27 is a fitting plate for mounting the torsion plate 7 on the fitting surfaces of the support plates 4, 8 and the intermediate plate 6.

The disc 5 used for the unit 1 comprises a body portion 28 to be fixed in the disc support hole 13 of the support plate 4 by force-fitting or the like and projectingly curved contact surfaces 29 disposed on both sides of the body portion 28. Further, the disc 5a on the lower end surface comprises a body portion 30 to be fixed in the disc support hole 20 of the support plate on the lower end side and a projectingly curved contact surface 31 disposed on one side of the body portion 30. Furthermore, the disc 5b on the upper end side comprises a body portion 32 to be force-fitted into the disc support hole 23 of the support plate 9 at the extreme end side and a projectingly curved contact surface 33 disposed on one side of the body portion 32.

Each of the units 1, 1, ... composed of the above members is such that first, the disc 5 is force-fitted into the support plate 4 and the bushes 26 are force-fitted into the bush engaging holes 12, then the fitting surfaces 19 of the torsion plates 7, 7 are abutted against the plate fitting surfaces 4a on the front and back sides of the support plate 4. The fitting plates 27 are then placed on the torsion plates 7 and placed on them and they are fixed by screws 34 and positioning pins 35. At that time, since the sets of the fitting surfaces 4a of the support plate 4 are each locating on the front side and back side thereof and confronting symmetrically with respect to the axis of the support plate 4 form respective pairs of them with their phases, the torsion plates 7, 7 are mounted on the front and back sides of the support plates 4 with their phases shifted 90°. Next, one of the above two torsion plates 7, 7 is attached to the intermediate plate 6 by fixing the plate fitting surfaces 19, 19, defined on the torsion plate 7, symmetrical with respect to the axis thereof to the plate fitting surfaces 15, 15, defined on the intermediate plate 6, symmetrically defined with respect to the axis thereof likewise, by screws 34 and positioning pins 35 through the above fitting plates 27.

The prescribed number of the units 1,1, . . ., arranged as described above are connected by the intermediate plates 6 and the torsion plates 7 of these units successively attached using the above fitting plates 27.

Note that the bushes 26 are engaged with the bush engaging holes 12 of the support plate 4 of the above unit 1.

As shown in FIG. 5, each of the fitting surfaces 4a, 15, 22 and 25 of the support plates 4, 8, and 9 and the intermediate plate 6 to which the above torsion plate 7 is attached, is inclined an angle with respect to the surface perpendicular to the axis thereof to make the outside thereof thin, and the four corners of the torsion plate 7 are inclined in conformity with the configuration of the above plate fitting surfaces 4a, 15, 22 and 25.

In addition, the screws 34 for attaching the torsion plate 7 are composed of flat head screws with locking washers used as necessary.

Wires 35 are passed through four holes defined at the four corners of the respective units 1, 1, . . . connected as described above with the respective extreme ends thereof fixed to the support plate 9 of the upper end side unit 3 and the base ends thereof connected to four cylinders 36a, 36b, 36c and 36d disposed on the lower side of the base end plate 8 of the base end unit 2. These cylinders 36a–36d are fixed to the base end plate 8 of the base end plate 8.

The material of the above components, the support plate 4 and the intermediate plate 6, are composed of a light material such as aluminum alloy, plastics or the like. The torsion plate 7 is composed of spring steel, the fitting plate 27 is composed of steel and the base and extreme end plates 8 and 9 are composed of aluminum alloy or steel.

In the above arrangement, the flexible arm is curved at the respective units 1, 1, . . . by the four cylinders 36a–36d which are selectively expanded and contracted. At the time, the respective units 1, 1, . . . are rolled and displaced at the contact surfaces of the discs 5, 5a and 5b. In this action, only the force relating to the stress applied to the contact surfaces of the discs 5, 5a and 5b and the support plate 4 is transmitted to the respective units 1, 2, and 3 and reactions caused by friction and rigidity are absorbed by the intermediate plates 6 and the twist plates 7 disposed about the axial center thereof with their phases shifted 90°. In addition, the torsion force of the torsion plate 7 is absorbed by the inclined fitting portion of this torsion plate 7. Further, since the fitting portion of the above torsion plate 7 is inclined, the rear sides of the fitting portions the support plate 4 and the intermediate plate 6, confronting against the fitting portion, are not abutted against the fitting plate 27.

Note that in the above arrangement, the plate fitting surfaces 4a, on the front and back sides of the support plate 4, may have the same phase about the axial center. In addition, the respective plate fitting surfaces may not be inclined and parallel with a surface perpendicular to the axis. Further, the material constituting the support plate 4 and the intermediate plate 6 is not limited to the light material but may be arbitrarily selected. Furthermore, the torsion plates 7, 7 may have a flat configuration.

Although the flexible arm of the above embodiment is composed of a plurality of units 1, 1, . . . stacked in series with the discs of the respective units in contact, an arrangement with the upper end unit 3 directly stacked on the lower side unit 3 is included in the embodiment of the present invention.

As described above in detail, according to the present invention, when the flexible arm is curved, only the force relating to jobs of the stress applied to the contact surfaces of the discs 5, 5a and 5b and the support plate 4 is transmitted to the respective units 1, 2, and 3 and reactions caused by friction and rigidity are absorbed by the intermediate plates 6 and the twist plates 7 disposed about the axial center with their phases shifted 90°. The damage of the torsion plate 7 and the partial wearing of the contact surfaces of the discs 5, 5a and 5b are thereby prevented to assure that a smooth curving action is effected for an extended period. Further, since reactions from the respective discs 5, 5a and 5b, and the support plates 4 supporting them are absorbed by the intermediate plates 6 through the torsion plates 7, the extreme end of the flexible arm can be easily located at a target position.

What is claimed is:

1. In a flexible arm composed of a plurality of units disposed by being stacked in series and an actuating device connected thereto for curving the respective units, each of the units comprising:
   (a) one disc having projectingly-curved contact surfaces defined on both sides thereof;
   (b) one support plate provided with a central hole defined coaxially with the axial center thereof to which said disc is fixed and a plurality of plate fitting surfaces alternately defined on both sides at the peripheral portion thereof with their phases shifted 90° about the axial center, each pair of the fitting surfaces being composed of those symmetrical with respect to the axial center;
   (c) two torsion plates each provided with a hole defined at the center thereof for loosely accommodating said disc and a plurality of plate fitting surfaces alternately defined on both sides at the peripheral portion thereof with their phases shifted 90° about the axial center thereof, the fitting surfaces defined on the same surface of said torsion plate in an axial direction being fixed to each pair of the plate fitting surfaces on both sides of said support plate; and
   (d) one intermediate plate provided with a central hole defined coaxially with the axial center thereof with which said disc is loosely engaged and plate fitting surfaces which are defined on both sides in the axial direction at the peripheral portion thereof and have their phases shifted 180° from one another so that they are symmetrical with respect to the axial center, said plate fitting surfaces being fixed to a pair of the fitting surfaces on a side, which is not fixed to the plate fitting surfaces of said support plate, of one of said two torsion plates, whereby the respective discs of said respective units are brought into contact with each other and the torsion plate and the intermediate plate of each unit are connected by the respective fitting surfaces.

2. A flexible arm according to claim 1, wherein the respective plate fitting surfaces of said support plate and said intermediate plate are inclined with respect to a surface perpendicular to the axis thereof so that they are made thinner toward the outside of said peripheral portions and the respective fitting surfaces of said torsion plates are fixed along this inclination.

* * * * *